United States Patent [19]

Nakagawa

[11] Patent Number: 4,860,128

[45] Date of Patent: Aug. 22, 1989

[54] RECORDABLE DATA DEVICE HAVING IDENTIFICATION SYMBOLS FORMED THEREON AND COOPERATING DATA PROCESSING SYSTEM HAVING REGISTERING SYMBOLS

[75] Inventor: Katsuya Nakagawa, Kusatsu, Japan

[73] Assignee: Nintendo Co., Ltd., Kyoto, Japan

[21] Appl. No.: 856,042

[22] Filed: Apr. 24, 1986

[30] Foreign Application Priority Data

Apr. 24, 1985 [JP] Japan .................................. 60-61383
Sep. 25, 1985 [JP] Japan .................................. 60-147057

[51] Int. Cl.$^4$ ...................... G11B 19/10; G11B 23/03
[52] U.S. Cl. ..................................... 360/60; 360/133
[58] Field of Search ......................... 360/60, 132, 133; 206/312, 444; 369/291

[56] References Cited

U.S. PATENT DOCUMENTS

| | | | |
|---|---|---|---|
| 3,739,106 | 6/1973 | Huijsers | 360/60 |
| 3,755,641 | 8/1973 | Rackman | 360/60 |
| 3,772,662 | 11/1973 | Blair | 360/60 |
| 3,818,190 | 6/1974 | Silverman et al. | 360/60 |
| 3,839,736 | 10/1974 | Hoshall | 360/132 |
| 3,859,634 | 1/1975 | Perron et al. | 235/382 |
| 3,883,856 | 5/1975 | Saito et al. | 340/173 SP |
| 3,900,170 | 8/1975 | Serizawa | 360/132 |
| 3,934,122 | 1/1976 | Riccitelli | 235/280 |
| 4,095,791 | 6/1978 | Smith et al. | 273/856 |
| 4,117,605 | 10/1978 | Kurland et al. | 360/132 |
| 4,120,030 | 10/1978 | Johnstone | 364/200 |
| 4,149,027 | 4/1979 | Asher et al. | 174/52 R |
| 4,218,582 | 8/1980 | Hellman et al. | 178/22 |
| 4,239,103 | 12/1980 | Coleman et al. | |
| 4,301,486 | 11/1981 | Brown et al. | 360/133 |
| 4,352,492 | 10/1982 | Smith | 273/16 C |
| 4,446,519 | 5/1984 | Thomas | 364/300 |
| 4,454,594 | 6/1984 | Heffron et al. | 364/900 |
| 4,458,315 | 7/1984 | Uchenick | 364/200 |
| 4,462,076 | 7/1984 | Smith, III | 364/200 |
| 4,471,163 | 9/1984 | Donald et al. | 178/22.08 |
| 4,492,582 | 1/1985 | Chang et al. | 434/169 |
| 4,500,879 | 2/1985 | Smith, III et al. | 340/739 |
| 4,562,230 | 12/1985 | Chou et al. | 178/22.08 |
| 4,575,621 | 3/1986 | Dreifus | 235/380 |
| 4,575,622 | 3/1986 | Pellegrini | 235/382 |

FOREIGN PATENT DOCUMENTS

| | | |
|---|---|---|
| 0086395A | 8/1983 | European Pat. Off. . |
| 0114522 | 8/1984 | European Pat. Off. . |
| 0219980A | 5/1987 | European Pat. Off. De. |
| 273682341 | 3/1978 | Fed. Rep. of Germany . |
| De. 3313802A | 10/1983 | Fed. Rep. of Germany . |
| 2015235A | 9/1979 | United Kingdom . |
| 2021334A | 11/1979 | United Kingdom . |
| 2098784A | 11/1982 | United Kingdom . |
| 2131000A | 11/1983 | United Kingdom . |
| 2134306A | 8/1984 | United Kingdom . |
| 2127204A | 9/1988 | United Kingdom . |

*Primary Examiner*—Alan Faber
*Assistant Examiner*—Surinder Sachar
*Attorney, Agent, or Firm*—Nixon & Vanderhye

[57] ABSTRACT

A recordable data device includes a case and a magnetic disk rotatably contained therein. There, in the case, an insertion opening through which a magnetic head of a disk drive device, constructing a part of a data processing system, can contact the magnetic disk, onto which a recessed identifying embossment has been formed. The magnetic disk drive device comprises an insertion opening or inserting the data recording device and an identifying symbol of a projected embossment which is formed near the insertion opening. When the recordable data device is loaded into the disk drive device, the recessed embossment of the identifying symbol of the magnetic disk is fitted into the projected embossment of the identifying symbol of the magnetic disk drive device. If the data recording device is authentic, the data processing system allows the disk drive device to data to or read data from the magnetic disk. If the embossed identifying symbols do not fit, the floppy disk, that is, the recordable data device, is rejected as not authentic and data-writing or data reading is prevented.

22 Claims, 7 Drawing Sheets

RECORDABLE DATA DEVICE HAVING IDENTIFICATION SYMBOLS FORMED THEREON AND COOPERATING DATA PROCESSING SYSTEM HAVING REGISTERING SYMBOLS

BACKGROUND OF THE INVENTION

1. Field of the Invention

The present invention relates to a recordable data device and the data processing system employing the same. More specifically, the present invention relates to a recordable data service, such as a floppy disk or an IC card, which is inserted into a read/write unit, and the system employing the same.

2. Description of the Prior Art

Recently, compact type floppy disks, such as those of 2.5 inches, 2.8 inches, 3 inches or 3.5 inches in diameter have been used as memory devices for personal computers and home television game machines or the like. Such a compact type floppy disk includes a plastic case and a magnetic disk rotatably contained therein.

These floppy disks of various forms and sizes have previously been produced by manufacturers. However, if the form and size of one disk is equal to that of another, each disk can be loaded into a floppy disk drive device (hereinafter called "FDD") regardless of difference in recording systems or data formats. Different types of floppy disks are interchangeable.

However, if one type of FDD is different from another, there are differences in the recording system (encoding system) or the data formats between the two, causing problems of data error and difficulty in finding points of data error when a floppy disk recorded in a certain type of FDD is played back by another type of FDD.

Further, if a commonly available floppy disk containing a software game program is sold, this program may be reproduced on non-recorded floppy disks (so-called blank disks) and illegally sold as low-priced software, whereby a software supplier may suffer economic losses. Furthermore, when low quality illegally reproduced floppy disks are sold, the software supplier is not only subject to economic losses, but the software creates trouble for users because of the bad quality of disks, thus damaging the image and reputation of the authentic floppy disk manufacturer.

There is, so far, almost no effective means to prevent data recording devices such as floppy disks from being reproduced illegally.

SUMMARY OF THE INVENTION

It is a principal object of the present invention, therefore, to provide a data recording device of the type useful in preventing the device from being reproduced without permission.

It is a further object of the invention to provide a data processing system of the type useful in accepting only authentic recordable data devices.

Another object of the invention is to provide a data recording device which can easily be detected, without fail, if it does not fit with a specified read/write unit.

Briefly, the present invention is a recordable data device and a read/write unit including: a case to be inserted through the read/write unit's insertion opening, a second identifying symbol formed on the case at a position opposite, when the case is inserted through the insertion openings, to a uniquely shaped first identifying symbol located on the read/write unit, said second identifying symbol having a specified shape corresponding to the first identifying symbol, and a recording medium contained within the case.

When the data recording device having the second identifying symbol is inserted into the insertion opening of the read/write unit, the first identifying symbol, for example, a projected embossment, is fitted into the second identifying symbol, for example, a recessed embossment. Then the recordable data device is normally loaded and the operation of data reading and data writing is carried out.

On the other hand, when a recordable data device not having a second identifying symbol, or not having a genuine symbol is inserted into the opening, the second identifying symbol of the recordable data device is not fitted into the first identifying symbol and the recordable data device is ejected and not loaded. Therefore, the operation of writing data to or reading data from the recordable data medium becomes impossible. In other words, the data recording device can be authenticated by its structure or form. This enables one to reliably and easily identify the recordable data device that does not match the specified read/write unit and prevents one from loading an unauthentic recordable data device, thus preventing unlawful recording or playback.

According to this invention, it is impossible to read data from an unfitted recordable data device written by a read/write unit other than the specified one. Thus it is possible to prevent the data error caused by using a recordable data device which has a recording system or format different than that of the genuine recordable data device, even though the unauthentic device can still be loaded into the unit.

Furthermore, if means are present for detecting whether a data recording device is authentic, it is possible to more effectively prevent use of false data recording devices.

The above and other objects, features, aspects and advantages of this invention will be more apparent from the following detailed description of illustrative embodiments when taken in conjunction with the accompanying drawings.

BRIEF DESCRIPTION OF THE DRAWINGS

FIGS. 2A through 2C are illustrated views of a floppy disk as one embodiment in accordance with the present invention, wherein

FIGS. 3A through 3C are illustrated views showing a major portion of an FDD, wherein

FIGS. 5A through 5B are illustrated views of a floppy disk of another embodiment in accordance with the present invention, wherein

DESCRIPTION OF THE PREFERRED EMBODIMENTS

Figure 1:
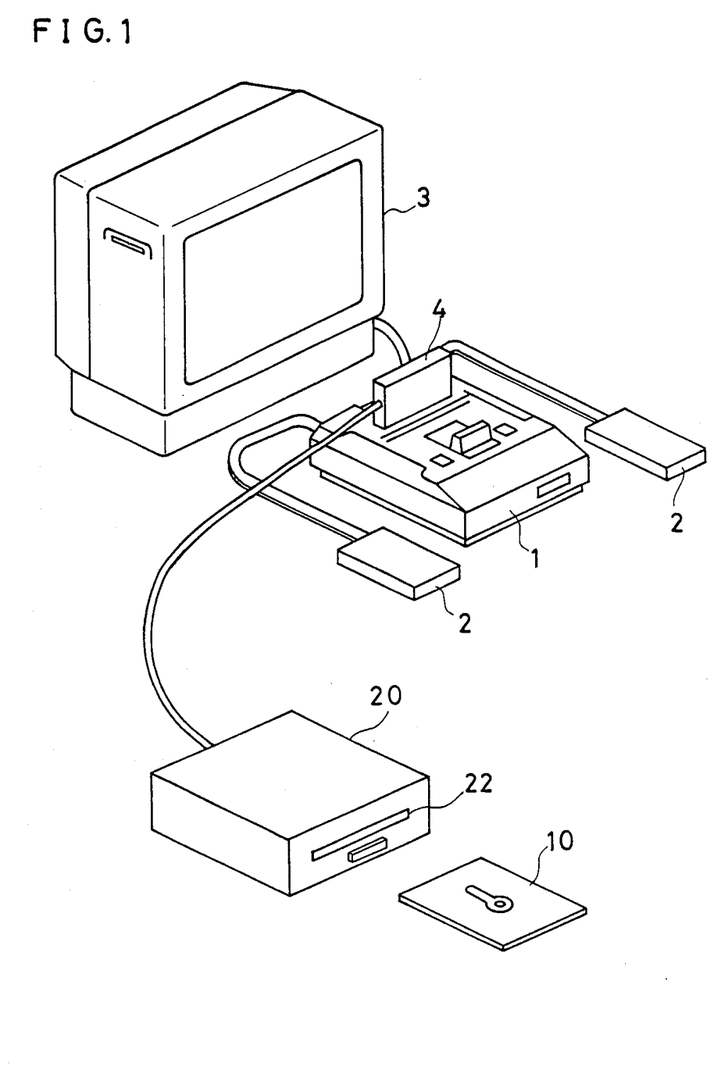
FIG. 1 is a perspective view of a home television game apparatus as one embodiment in accordance with the present invention.

FIG. 1 is a perspective view of a television game apparatus as one example of data processing systems to which the present invention is applicable. This television game apparatus is well known as a "Family Computer" or "Nintendo Entertainment System"; "NES" is manufactured and sold by the assignee of the present application.

Microcomputers and their related devices are provided in main unit 1 of the game machine. Two controllers 2, operating means of the game machine, are connected to the main unit 1. These controllers 2, when operated by a player, generate various commands and send them to the main unit 1. A display unit 3, including a raster cathode ray tube such as that of a television receiver, is connected to the main unit 1. Visual information of characters and backgrounds are displayed on the display unit 3. The player can play by operating the controller 2 so as to move the characters appearing on the display unit 3.

A connecting adapter 4 is attached by a free plug in the main unit 1. A data read/write unit or an FDD 20, which receives a floppy disk 10, as one example of a data recording device, is connected to the main unit 1 via the connecting adapter 4. The FDD 20 can write data to or read data from the floppy disk 10. For this purpose, a disk insertion opening 22 is formed in the front the the FDD 20.

Programs for various kinds of games are stored in the floppy disk 10, and these programs are read by the FDD 20 and input to the microcomputers (not shown) of the main unit 1 via the connecting adapter 4. Then the microcomputers carry out necessary data processing according to input from the controllers 2 and display results of data processing on a screen of the display unit 3. A player can enjoy other games by changing the floppy disk 10. Meanwhile, the FDD 20 can be used not only for these games but also for other general data processing when the microcomputers are applied to that purpose.

Figures 2A, 2B:
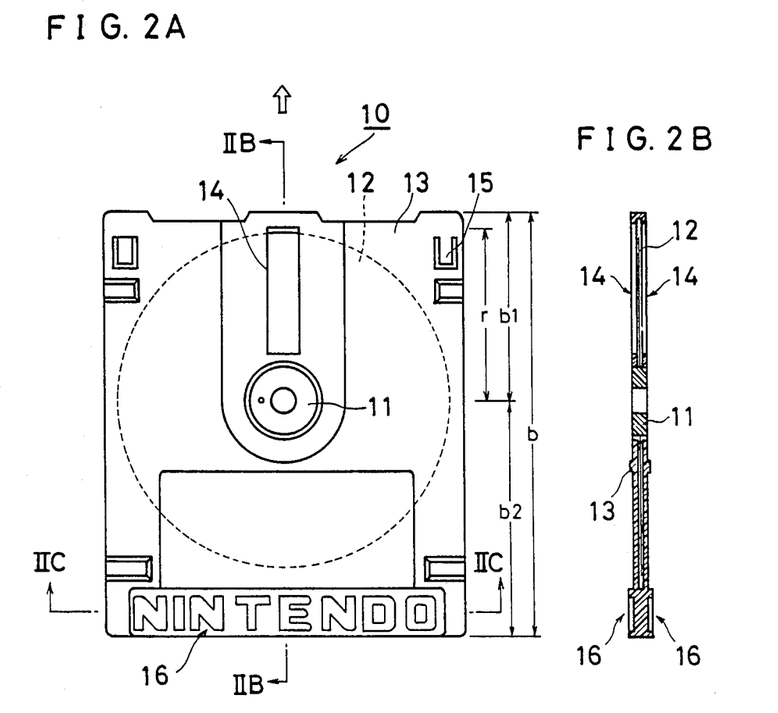
FIG. 2A is a plan view of the floppy disk.
FIG. 2B is a sectional view of the floppy disk taken along line IIB—IIB of FIG. 2A.
Figure 2C:
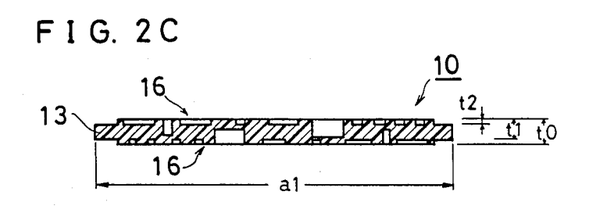
FIG. 2C is a sectional view of the floppy disk taken along line IIC—IIC of FIG. 2A.

FIGS. 2A through 2C are illustrated views showing one example of a floppy disk to which the present invention was applied. A floppy disk 10 includes a magnetic disk 12 having a hub 11 fixed at the center thereof and a case 13 of plastic molding for containing the magnetic disk.

The outer shape of the case 13 is made larger than that of the magnetic disk 12. The width of the case 13, that is, its lateral length a1 in FIG. 2C, is made smaller than the width a2 of the insertion opening 22 of the FDD 20 shown in FIGS. 3A to 3C.

The longitudinal length of the case 13, that is, the length b along a direction of disk insertion denoted by an arrow in FIG. 2A, is longer than the diameter 2r of the magnetic disk. The length b2 from the center of the magnetic disk 12 to the back end (the lower side of FIG. 2A) of the case 13 in the direction of insertion is longer than the length b1 from the center of the magnetic disk 12 to the front end (the upper side of FIG. 2A) of the case 13 in the direction of insertion, (b1<b2).

On both main surfaces of the case 13, a head insertion opening 14 is formed from a point near the center of the magnetic disk 12 to a point near the front end of the case 13 along the direction of insertion.

On the side surfaces of the front end portion of the case 13, nails 15 which protect the magnetic disk 12 from being data-written by folding the same are formed.

Further, both main surfaces of the case 13 are provided with an identifying symbol 16 along the back end of the case, which forms a feature of the present invention. The identifying symbol 16 includes an assembly of alphabet letters, kana (Japanese letters) and numerals forming, for example a trademark, in a recessed pattern of embossing.

Identifying symbols are not limited to characters shown in the drawings but may include many symbols such as circles, triangles, squares and nonsense symbols such as a zig-zag pattern, a line varying its thickness or position gradually. These symbols are called "character" as a whole in this specification.

In the embodiments shown, the identifying symbol 16 has the characters "NINTENDO" formed in a recessed pattern of embossment. It is preferable to have, in the identifying symbol, a combination of plural characters and characters placed at specified positions or classified in specified sorts. For example, in the embodiment shown, the second character from the left in "NINTENDO", "I", and the sixth character, "N", have deeper recessed portions than that of other characters. The thickness of the case 13 is t0. Depth t1 is the depth of a character formed deeper and is larger than depth t2, the depth of a character formed shallower. Also, t1 is larger than ½ t0, that is t2<t0/2<t1<t0). When some specified characters in the identifying symbol 16 are made to have different recess depth from other characters, it is easy to discriminate an authentic disk having the above mentioned identifying symbol 16 from an unauthentic disk which has a recessed embossment but has a constant depth for each character.

When the floppy disk 10 is used for single surface recording, forming the identifying symbol 16 on one surface will suffice, but when the disk 10 is used for recording on surfaces, the identifying symbol 16 is formed on both sides of the case 13. In this case, specified characters recessed deeper in the identifying symbol 16, such as "I" and "N", are formed on both sides of the case 13 but do not overlap each other from the opposite sides. The reason for this formation is that if these specified characters do overlap, then the disk case becomes perforated and the disk cannot be discriminated from authentic disks having complete perforations. However, the present invention does not exclude such casing perforations.

The case 13 may be made by combining two halves. The case 13 may be provided with a slidable shutter to selectively shut the head insertion slot.

Figure 3A:
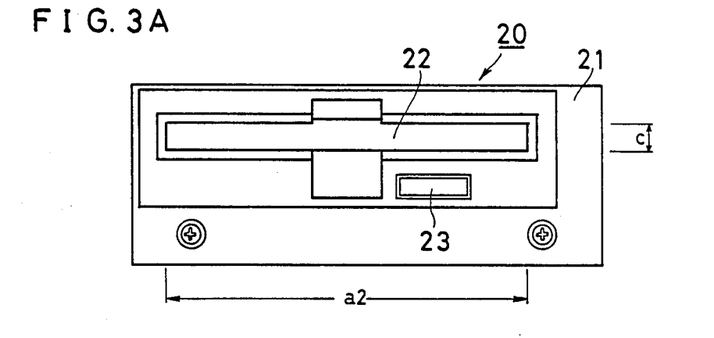
FIG. 3A is a plan view of the FDD.
Figure 3B:
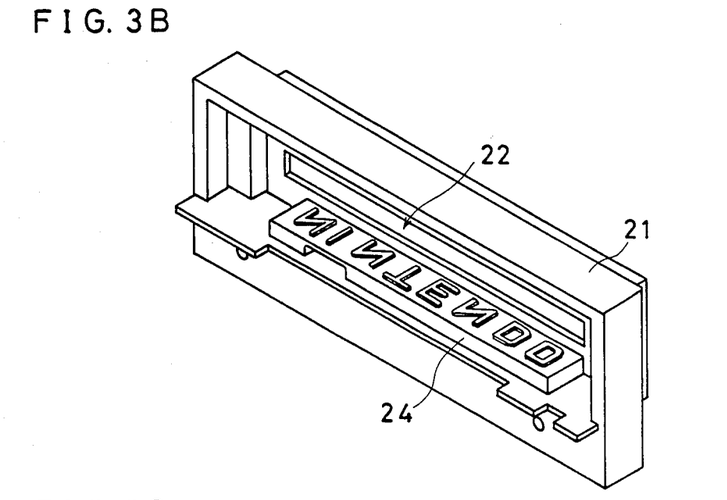
FIG. 3B is a perspective view of inside an insertion opening of the FDD and FIG. 3C is an illustrative cross-sectional view of FIG. 3B.
Figure 3C:
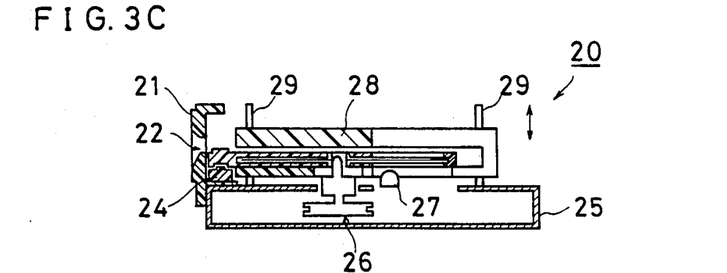

FIGS. 3A through 3C are illustrated views showing a major portion of an FDD. A front panel 21 of the FDD 20 is provided with a wide insertion opening 22 measured horizontally. In the opening 22, horizontal dimension, a2, is greater than the width a1 of the floppy disk 10, (a1<a2), and the direction perpendicular to the width, that is, the height c of the opening, is larger than the thickness t0 of the floppy disk 10, (c<t0). An eject button 23 is provided under the insertion opening 22 in order to take out the floppy disk 10.

An identifying symbol 24 is formed horizontally inside the insertion opening 22, in the embodiment shown, on the bottom of the opening 22. The identifying symbol 24 is made such that it is able to fit into the identifying symbol 16, which is composed of recessed embossment on the case 13 of the floppy disk 10. The character or an assembly of characters of the identifying symbol 24 form a mirrored image of the character or characters of the identifying symbol 16, and have a projected pattern of embossment.

In this way, the identifying symbol 16 of the floppy disk 10 is composed of the recessed pattern of embossment, while the identifying symbol 24 of the FDD 20 is composed of projected pattern of embossment. if these embossment patterns are exchanged, the authentic floppy disk cannot be discriminated from a false disk in which a raised symbol, corresponding to the identifying symbol 16 on the case 13, is formed onto a flat surface.

Characters of the identifying symbol 24 which correspond to the deeper etched characters of identifying symbol 16 are raised higher than the other characters of identifying symbol 24, as seen from FIG. 3B.

A casing 25 is fixed to the rear surface of front panel 21, on the lower portion of the interior of the insertion opening. The casing 25 is provided with a rotation drive system 26, which rotates the magnetic disk 12, and a magnetic head 27. On the upper surface of the casing 25, a holder 28 for holding the magnetic disk 12 freely slides up and down, supported by a guide post 29. The holder 28, in its uppermost position, accepts the floppy disk 10 inserted through the opening 22. When the floppy disk 10 is inserted, the holder and disk are pushed down to the lowermost position by a connecting rod (not shown), and recording and playback is now possible. At the lowermost position of the holder 28, the position at which the floppy disk 10 is loaded for recording and playback, a loading detection switch (designated by the numeral 31 shown in FIG. 4) is provided to detect whether the floppy disk 10 having the identifying symbol 16 is properly loaded.

Preferably, a sensor for detecting casing perforations, such as a photoelectric sensor (designated by the numeral 32 shown in FIG. 4), is provided near the identifying symbol 24 to detect unauthentic disks in which a symbol similar to the identifying symbol 16 of the floppy disk 10 has been formed with characters perforating the casing.

When the floppy disk 10 having an authentic recessed embossment of the identifying symbol 16 is inserted into the insertion opening 22, the holder 28 moves downward and the characters of the projected pattern of embossment of the identifying symbol 24 of the FDD 20 fit into the recessed characters of the identifying symbol 16. There are no gaps between the floppy disk and the FDD, the holder 28 is able to be pushed down to the lowermost position, and the floppy disk 10 can be properly loaded for recording or playback. In this event, a loading detection switch 31 shown in FIG. 4 activates and the photoelectric sensor 32 deactivates.

Figure 4:
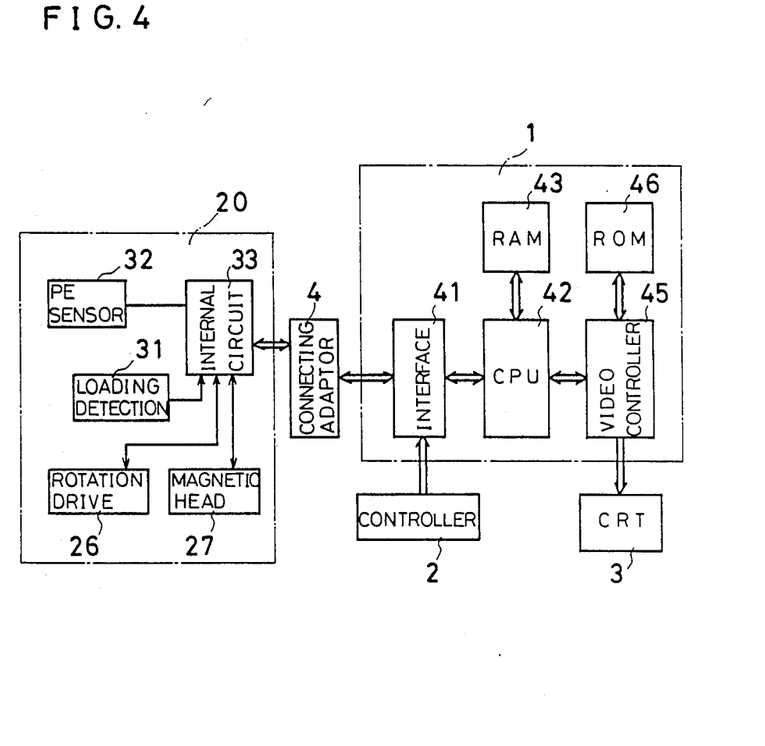
FIG. 4 is a block diagram showing a configuration of the embodiment shown in FIG. 1.

Both detection signals are given via an internal circuit 33 and a connection adapter 4 to an interface 41 included in the main unit 1. Accordingly, a CPU 42 containing a microcomputer gives a read signal (or write signal) to the internal circuit 33 to enable reading (or writing) to occur. Next, the internal circuit 33 enables the rotation drive system 26, and the program being read from the floppy disk 10 by the magnetic head 27 is transferred to the interface 41. This program is loaded in a RAM 43.

Then, when a player starts a game by operating the controllers 2, the CPU 42 provides data for controlling the game, based on the program information stored in RAM 43, to a video controller 45. The video controller 45 allows the display unit 3 to display pictures for games depending on input data and character information stored in ROM 46.

To take out the floppy disk, the eject button 23 is depressed, the locked disk is released, and the holder 28 moves upward, thereby ejecting the floppy disk.

If the identifying symbol 16 of the floppy disk 10 is different than that of an authentic disk, or if the disk has no symbol, a predetermined relationship does not exist between the identifying symbols of the FDD 20 and the disk, and the disk may be an unauthentic floppy disk. When such an unauthentic floppy disk is inserted into the insertion opening 22, the holder 28 moves downward, but the embossed portion of the identifying symbol 24 contacts with a portion of the undersurface of the floppy disk irregularly and a slight gap between the unauthentic floppy disk and the identifying symbol 24 results. Accordingly, holder 28 does not reach its lowermost position and the disk has not been properly loaded. Therefore, the loading detection switch 31 is not activated, the CPU 42 does not output a read/write signal, and the read/write operation is prevented.

In the case where an unauthentic floppy disk has a symbol corresponding to identifying symbol 16, except that the symbol has perforated the casing, the disk loads normally and the loading detection switch activates, but the photoelectric sensor 32 also activates and detects the hole. Thus the CPU 42 does not output a read/write signal and the read/write operation is prevented.

According to the embodiment of the present invention, only the floppy disks having the specified identifying symbol 16 are allowed to read and write data because the unauthentic disks are unable to properly load into the FDD 20. Therefore, unauthentic floppy disks are not physically accessible to the FDD 20. This structural feature of the recordable data device prevents data error arising from difference in recording systems. Also, it is easy to exclude software illegally reproduced on a blank floppy disk, a pirate copy, from use. Therefore, it is helpful in protecting software distribution.

Figure 5A:
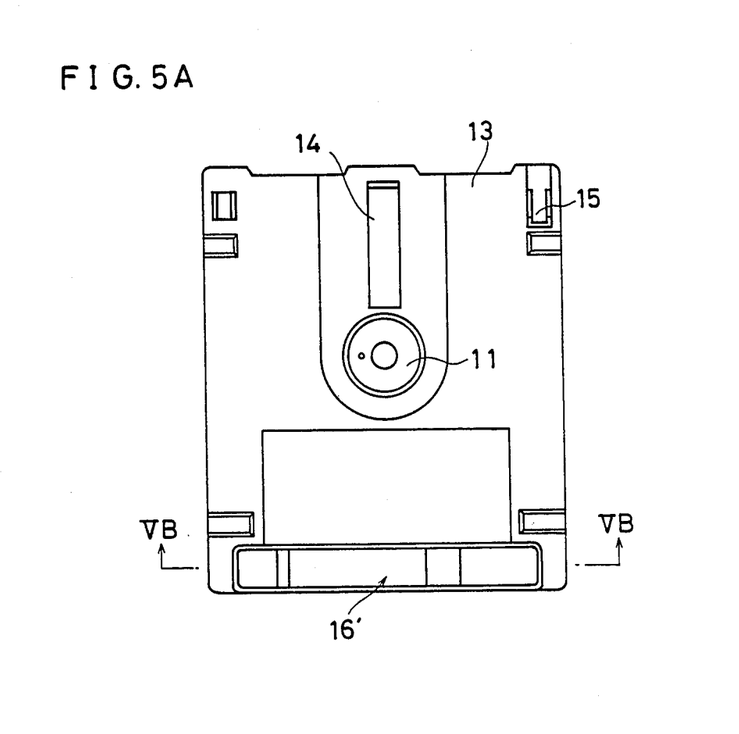
FIG. 5A is a plan view of this floppy disk and FIG. 5B is an illustrated cross-sectional view of the floppy disk taken along line VB—VB of FIG. 5A.
Figure 5B:
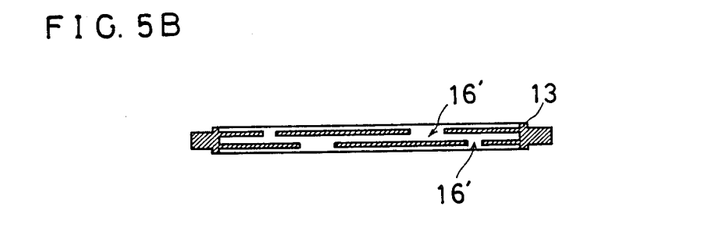

FIGS. 5A and 5B are the illustrated views showing another example of floppy disks to which the present invention is applicable. In this embodiment, the identifying symbol 16 is modified compared with the embodiment of FIGS. 2A to 2C. More specifically, in the former embodiment, the identifying symbol 16 forms a trademark "NINTENDO" which is an arrangement of readable or perceptible characters, while in the present embodiment, only a portion corresponding to the specified characters "I" and "N" of the identifying symbol 16 are formed into the recessed pattern of embossment as an identifying symbol 16'. Using a floppy disk 10 having a modified identifying symbol 16' enables the FDD 20 to operate normally, because identifying symbol 16', as clearly illustrated in FIG. 5B, is equivalent to the recessed pattern of embossment of the identifying symbol 16.

More specifically, as described above, the portion "I" and "N" of the identifying symbol 16 in FIG. 2C has a larger depth t1. Similarly, the corresponding portion of the identifying symbol 16' has also a larger depth t1. Therefore, when the floppy disk 10 shown in FIGS. 5A and 5B is inserted into the insertion opening 22 of the FDD 20 shown in FIGS. 3A to 3C, the identifying symbol 16' completely fits into the identifying symbol 24 of the projected pattern of embossment on the insertion opening 22.

Figure 6:
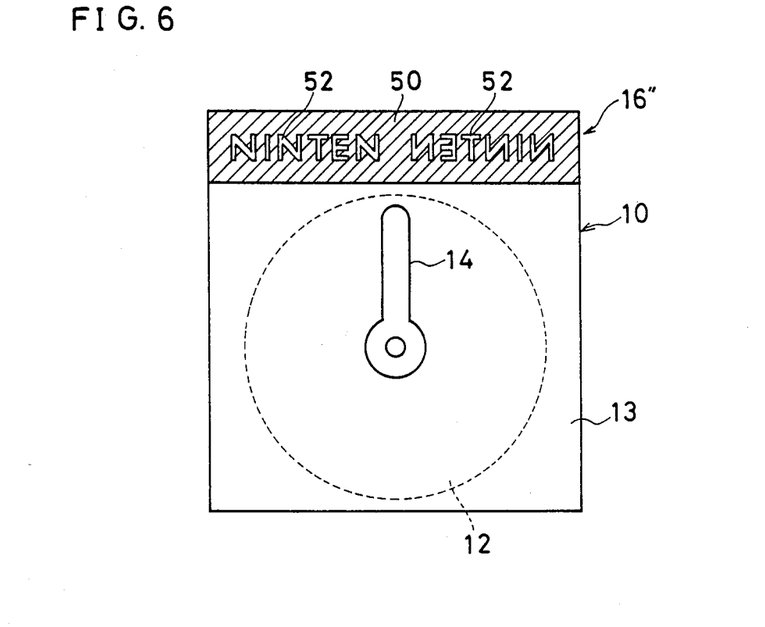
FIG. 6 is an illustrated plan view of a floppy disk of still another embodiment in accordance with the present invention.

FIG. 6 is an illustrated view showing another type of floppy disk to which the present invention is applicable. The identifying symbol 16 or 16' in the embodiments described so far is formed at the back end of the floppy disk 10 with regard to the direction of insertion, while in the present embodiment the identifying symbol is formed at the front end. However, the position of this identifying symbol 16" may be at the back end similarly to the aforementioned embodiments.

A floppy disk 10 of this embodiment, includes a case 13 which is provided with a head insertion opening 14 and an identifying symbol 16". The area of the identifying symbol 16" is provided with a conductive film 50 by means of metal evaporation, for example. In this identifying symbol 16" there is an assembly of characters similar to the aforementioned embodiments. However, as opposed to the aforementioned embodiment, in this embodiment only "NINTEN", part of the trademark "NINTENDO", is formed. The assembly of characters "NINTEN" is formed as casing perforations.

Further, since the magnetic disk 12 is usually formed for use of both sides, this identifying symbol 16" comprises a pair of "NINTEN". One "NINTEN" is an identifying symbol for one side of the magnetic disk and the other "NINTEN" is an identifying symbol for the opposite side of the magnetic disk.

Figure 7:
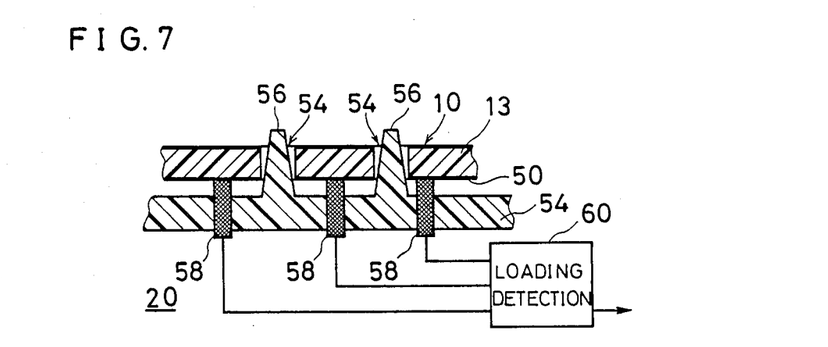
FIG. 7 is an illustrated cross-sectional view showing a major portion of an FDD employing the embodiment in FIG. 6.
Figure 8A:
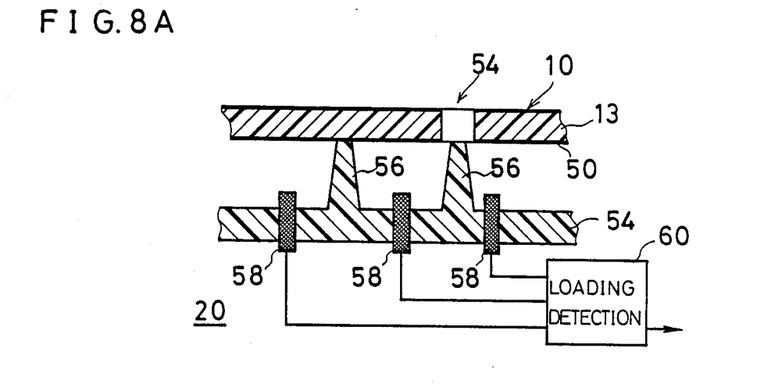
FIGS. 8A and 8B respectively are illustrated cross-sectional views showing the floppy disk of the embodiment in FIG. 7 being not normally loaded.
Figure 8B:
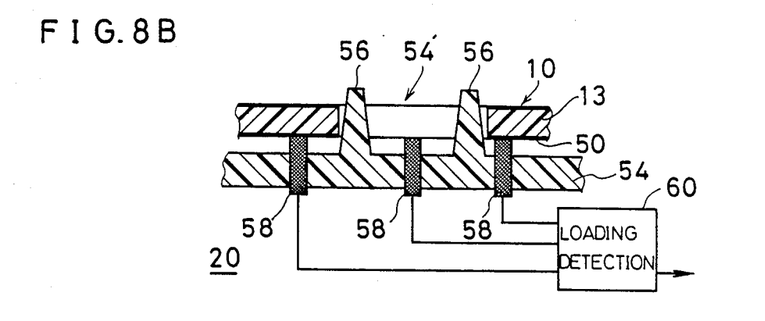
Figure 9:
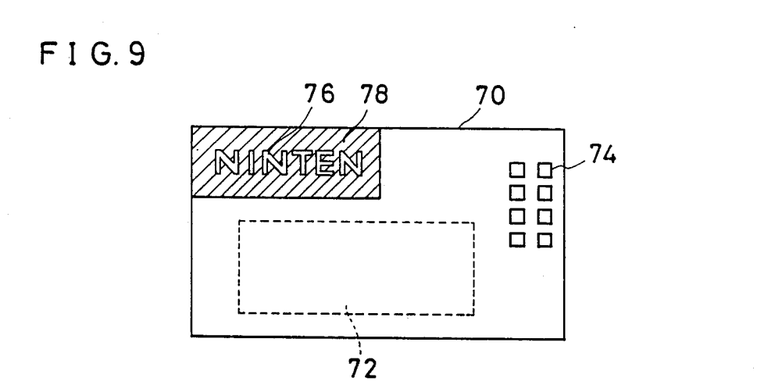
FIG. 9 is an illustrated plan view of an IC card as still another embodiment in accordance with the present invention.

FIGS. 7 through 9 are illustrative cross-sectional views showing relations between an FDD and a floppy disk employing the embodiment of FIG. 6. The FDD 20 is provided with a table 54 which supports a loaded floppy disk 10.

The table 54 is provided with protrusions 56 as identifying symbols. These protrusions 56 are formed to fit into casing perforations 52 of the identifying symbol 16" of the floppy disk 10. The protrusions 56 are formed in the same pattern as that of "NINTEN", the assembly of identifying characters.

Further, the table 54 is provided with a plurality of electrodes 58 around the projections 56, which are connected to a loading detection circuit 60. In this embodiment, whether or not the genuine floppy disk 10 is normally loaded into the FDD 20 is detected by whether each electrode 58 is short-circuited.

When the floppy disk 10 is inserted into the insertion opening 22 of the FDD 20, the floppy disk 10 is placed on the table 54 inside the FDD 20. At this time, if the specified identifying symbol 16" formed by the casing perforations 52 is present on the floppy disk 10, the casing perforations 52 intersect with the protrusions 56 of the FDD 20 such that protrusions 56 fit through the casing perforations 52. Then, the floppy disk 10 has been properly loaded as shown in FIG. 7.

In the normal state shown in FIG. 7, the conductive film 50 formed on the identifying symbol 16" contacts each electrode 58 simultaneously. Therefore, the respective electrodes 58 are short-circuited. Then, the loading detection circuit 60 detects this short circuit and outputs a detection signal. In response to this detection output, the FDD 20 writes data to or reads data from the floppy disk 10 similarly to the aforementioned embodiments.

When the casing perforations 52 of the identifying symbol 16" formed on the floppy disk 10 do not have the correct pattern, as shown in FIG. 8A, casing perforations 52 do not fit into the protrusions 56, even though the floppy disk 10 can be inserted into FDD 20, the floppy disk 10 cannot be physically loaded. Also, as shown in FIG. 8A, the floppy disk 10 is positioned above table 54 and the electrodes 58 can not contact the conductive film 50. Therefore, the loading detection signal does not output from the loading detection circuit 60, and reading or writing data is impossible.

Further, when the floppy disk 10 having a large casing perforation 52', surrounding the "NINTEN" of the casing perforations 52, is inserted into the FDD, the casing perforation 52' engages the 20 protrusion 56 as shown in FIG. 8B and the floppy disk 10 may be physically loaded. In this case, however, since some of the electrodes 58 coincide with the casing perforation 52', all of the electrodes 58 are not necessarily short-circuited simultaneously and, therefore, the loading detection signal does not output from the loading detection circuit 60 as in FIG. 8A.

In addition, if casing perforations of characters not corresponding to the identifying symbol 16" are formed, the loading detection circuit 60 does not output the detection signal as in FIG. 8B.

As the recordable data device of this invention the IC card may be used instead of the floppy disk 10.

FIG. 9 is an illustrated view showing one example of IC cards as another embodiment in accordance with the present invention. This IC card 70 includes an integrated circuit 72 and an electrode 74 contained in a case of synthetic resin. The integrated circuit 72 includes a semi-conductor memory. The electrode 74 is used for connecting the integrated circuit 72 to external system.

The identifying symbol 76 is formed on a predetermined region of the case of the IC card 70. A conductive film 78 is formed on the surface of the identifying symbol 76 by metal evaporation, for example. A casing perforation having the same shape as that of the casing perforations 52 shown FIG. 6 is formed on a predetermined position of the identifying symbol 76. The IC card 70 is only loaded with the surface shown in FIG. 9 up, therefore only one casing perforation is formed.

The IC card 70 is loaded into a read/write unit having an insertion opening like the FDD 20, but detailed illustrations and descriptions of the unit are omitted here.

It will be apparent from the foregoing that, while the invention has been illustrated and described in detail, the illustrations and their descriptions are given only for the purpose of examples and the present invention is not limited specifically to the foregoing embodiments. Accordingly, the spirit and scope of the invention is limited only by the appended claims.

What is claimed is:

1. A floppy disk capable of being inserted into an insertion opening of a read/write unit, comprising:
   a rigid case having a substantially rectangular shape and being insertable into said insertion opening of said read/write unit, said case having opposite substantially rectangular main surfaces which form a space for containing a magnetic disk, said case assuming a first position during insertion or ejection of said case from said read/write unit, and said case being movable to a second position after insertion to complete loading of said case into said read/write unit to enable read/write operation, wherein the movement between said first position and said second position is substantially orthogonal to said main surface of said case; and recessed first identifying symbols formed on each of said opposite main surfaces at an end thereof in a direction of insertion of said rigid case, said recessed identifying symbols being formed symmetrically such that said case can be inserted into said opening of said read/write unit with either of said main surfaces facing upwards and one of said recessed identifying symbols will mate to a projected second identifying symbol which is formed inside said insertion opening of said read/write unit to allow said case to move from said first position to said second position to complete loading in said read/write unit, whereby reading of data by said read/write unit from said magnetic disk and writing of data by said read/write unit to said magnetic disk are not enabled unless one of said recessed identifying symbols and said projected identifying symbol mate.

2. A floppy disk in accordance with claim 1, wherein said first and second identifying symbols comprise an assembly of characters.

3. A floppy disk in accordance with claim 2, wherein an assembly of characters or symbols of said first identifying symbols are comprised of one or more registered trademarks or of a copyright.

4. A floppy disk in accordance with claim 2, wherein said second identifying symbol includes a protrusion and said first identifying symbols include a perforation of said case through which said protrusion can pass.

5. A floppy disk in accordance with claim 1, wherein said projected second identifying symbol includes at least one character projected higher than others and said recessed first identifying symbols include at least one character recessed deeper than other, said deeper recessed character corresponding to said higher projected character of said second identifying symbol.

6. A floppy disk in accordance with claim 1, wherein said second identifying symbol is formed near the front portion of said insertion opening of said read/write unit and said first identifying symbols are formed on the rear portion of said main surfaces of said case measured from the direction of insertion of said case.

7. A floppy disk in accordance with claim 1, wherein said second identifying symbol is formed near the back portion of said insertion opening of said read/write unit and said first identifying symbols are formed on the front portion of said main surfaces of said case measured from the direction of insertion of said case.

8. A floppy disk in accordance with claim 1, wherein said read/write unit includes a magnetic head, said floppy disk further comprising a head insertion opening formed on said case, through which said magnetic head contacts said floppy disk.

9. A floppy disk in accordance with claim 8, wherein said head insertion opening is formed on the front portion of said floppy disk as measured from the direction of insertion of said recordable data device into said read/write unit.

10. A floppy disk in accordance with claim 9, wherein said head insertion opening is formed symmetrically on both of said main surface of said case.

11. A floppy disk in accordance with claim 10, wherein said projected second identifying symbol includes at least one character projected higher than others and said recessed first identifying symbols include at least one character recessed deeper than others corresponding to said higher projected character of in said first identifying symbol.

12. A floppy disk in accordance with claim 11, wherein said first identifying symbols are offset so that there is no perforation of said case between said main surfaces.

13. A data processing system comprising:
a recordable data device;
a data processing unit; and
a read/write unit which transfers data between said recordable data device and said data processing unit whereby said read/write unit accepts said recordable data device to write data thereto or to read data therefrom, said read/write unit having an insertion opening through which said recordable data device is inserted, said recordable data device comprising a case having opposite substantially rectangular main surfaces and being inserted into said read/write unit opening, said case assuming a first position during insertion or removal of said case from said read/write unit and said case being movable to a second position after insertion to complete loading of said case into said read/write unit to enable read/write operation, wherein the movement between said first position and said second position is substantially orthogonal to said main surfaces of said case;

first recessed identifying symbols of a specified shape formed on each of said main surfaces of said case of said recordable data device, said recessed identifying symbols being formed symmetrically such that said case can be inserted into said opening of said read/write unit with either of said main surfaces facing upwards and one of said recessed symbols will be in opposition to a second identifying symbol of complementary shape formed in said opening of said read/write unit, one of said first identifying symbols and said second identifying symbol mating to allow said recordable data device to be moved from said first position to said second position to complete loading in said read/write unit, and means for detecting that said case has been moved from said first position to said second position to complete loading, whereby reading of data by said read/write unit from said recordable data device and writing of data by said read/write unit to said recordable data device are not enabled unless said first identifying symbol and said second identifying symbol mate; and a recording medium contained in said case.

14. A data processing system in accordance with claim 13, wherein said first and second identifying symbols comprise an assembly of characters.

15. A data processing system in accordance with claim 13, wherein said first identifying symbols are offset so that there is no perforation of said case between said main surfaces.

16. A data processing system in accordance with claim 13, wherein said first identifying symbols are comprised of one or more registered trademarks or of copyrighted material.

17. A data processing system in accordance with claim 13, which further comprises:
- a detection means for detecting whether one of said first identifying symbols is mated with said second identifying symbol when said data recording device is loaded through said insertion opening of said read/write unit, and
- means for allowing or preventing said read/write unit from writing data to or reading data from said recordable data device in response to a signal representing either abnormal or normal loading from said detection means.

18. A data processing system in accordance with claim 17, wherein said second identifying symbols include a protrusion and said first identifying symbol includes a perforation of said case through which said protrusion can pass.

19. A data processing system in accordance with claim 18, wherein said main surface has circumferential portions surrounding said first identifying symbols and further comprising electrically conductive sensing means disposed at said circumferential portions.

20. A data processing system in accordance with claim 19, wherein said protrusion of said second identifying symbol has a circumferential portion, and further comprising:
- a case perforation detecting means which includes a plurality of electrodes mounted around said circumferential portion of said protrusion of said second identifying symbol;
- conduction detecting means for detecting whether or not said electrodes are short-circuited by contacting said electrically conductive sensing means; and
- means for enabling said read/write unit to write data to or read data from said recordable data device in response to an output from said case perforation detecting means which is based upon the short-circuiting of said electrodes.

21. A data processing system in accordance with claim 17, wherein said projected second identifying symbol includes at least one character projected higher than others and said recessed first identifying symbols include at least one character recessed deeper than others, said deeper recessed character corresponding to said higher projected character of said first identifying symbol.

22. A data processing system in accordance with claim 21, which further comprises:
- a case perforation detecting means for detecting whether or not an area of said first identifying symbol on said case perforates said case; and
- means for allowing or preventing said read/write unit from writing data to or reading data from said recordable data device in response to or output from said case perforation detecting means denoting either perforation or non-perforation of said case.

* * * * *